United States Patent [19]

Fredrickson et al.

[11] 4,031,308
[45] June 21, 1977

[54] DIRECT CURRENT ARC FURNACE HEARTH CONNECTION INSTALLATION

[75] Inventors: Bengt Fredrickson; Sven-Einar Stenkvist, both of Vasteras, Sweden

[73] Assignee: ASEA Aktiebolag, Vasteras, Sweden

[22] Filed: Mar. 31, 1976

[21] Appl. No.: 672,305

[30] Foreign Application Priority Data

Apr. 1, 1975. Sweden .............................. 7503675

[52] U.S. Cl. ................................................. 13/9 R
[51] Int. Cl.² .......................................... H05B 7/00
[58] Field of Search ................... 13/1, 9, 18, 34, 12

[56] References Cited

UNITED STATES PATENTS 3,835,230 9/1974 Valchev et al. ..................... 13/9
3,949,151 4/1976 Kerton ................................ 13/12

*Primary Examiner*—R. N. Envall, Jr.
*Attorney, Agent, or Firm*—Kenyon & Kenyon, Reilly, Carr & Chapin

[57] ABSTRACT

A direct current electric arc furnace hearth connection of the liquid-solid type is initially installed as a metal billet in an opening in a furnace construction, with water-containing refractory material rammed around the billet. When the material dries and with the furnace in operation, a melt in the furnace, which the billet must contact, with incidental melting of the inner end of the billet, cannot escape around the billet, the outer end of the billet being cooled and remaining solid to form an electrical connection for operation of the furnace. To accelerate drying of the rammed water-containing or moist refractory forming a lining around the billet, a hole is formed through the billet and a gas flame is burned at the hole on the inside end of the billet, while the resulting hot gases are sucked out of the billet's outside end, the flow of hot gases through the length of the billet, heating the billet to dry the rammed refractory material, particularly throughout its portion most adjacent to the furnace, more quickly than can be effected by conduction of heat through a solid billet not having a hole.

2 Claims, 3 Drawing Figures

DIRECT CURRENT ARC FURNACE HEARTH CONNECTION INSTALLATION

BACKGROUND OF THE INVENTION

A direct current arc furnace requires conduction of the electric arcing power through the melt in the hearth of the furnace, in the usual arrangement where the melt has one polarity and the arcing electrode or electrodes have the other polarity. To make the hearth itself electrically conductive for this purpose, is generally considered to be unsatisfactory for various reasons.

Therefore, hearth electrodes of the liquid-solid type have been suggested by the prior art as exemplified by U.S. Pat. No. 3,789,127, dated Jan. 29, 1974, and in a much improved form, by the U.S. Stenkvist application Ser. No. 587,714, filed June 17, 1975.

The above type is exemplified by a steel billet extending through a furnace construction and having an inside end positioned for contact by a steel melt in the furnace and an outside end provided with cooling means. In operation, the inside end portion melts to the steel's liquid phase, but the steel billet remaining solid from its outer end and safely inwardly towards it inside end, by being cooled, as by watercooling, the solid outside end being available to form an electrical connection with a direct current power source which is, of course, also connected to arcing electrode or electrodes.

To accommodate such a hearth electrode, the furnace vessel is constructed with a suitably located passage for insertion of the billet which, as disclosed by the previously stated patent application, is preferably of a curved shape permitting the outer end which remains solid, to be positioned at a height safely above the melt level in the furnace.

With the billet positioned in the furnace vessel opening, refractory material in a generally plastic or moldable state, is rammed into the opening around the billet throughout the length of the billet which must extend through the furnace hearth or wall.

The refractory material may, for example, be a magnesite compound made in a plastic or moldable condition by being mixed with water. Therefore, the refractory used to fill the space around the electrode or billet formed by the furnace construction opening, which for practical reasons has a cross sectional area substantially larger than does the billet, is moist in the case of any new electrode installation and requires thorough drying before the furnace can be put into operation.

Heretofore, to dry the rammed and moist refractory around the billet in a new installation, it has been customary to heat the inside end of the billet, not required for an electrical connection with a power line, so that by conduction throughout the billet the necessary drying process is hopefully accelerated. However, steel has a relatively low thermal conductivity, so the conduction of heat throughout its length is relatively poor, making the drying undesirably slow.

SUMMARY OF THE INVENTION

According to the present invention, a hole is formed throughout the length of the steel billet. Incidentally, the term "steel" is intended to mean not only the plain carbon steel or steel alloys, but iron as well. More than one hole may be formed through the length of the steel billet. In other words, the steel billet is internally formed to provide for the conduction of gases throughout the length of the billet, it being in this sense that the term hole may be used. The billet or hearth electrode can be a casting, so any hole formed through it need not necessarily be circular.

With the billet now able to conduct gases, a gas flame is burned at the inside end, free from the billet's outside end where the electric line connection must be made, while at the outside end suction is applied to draw the hot gases thus produced, continuously throughout the length of the billet, thus heating the billet throughout its length with the billet obtaining its highest temperatures at its inner end and its portion adjacent to that end. This is of particular value because it is throughout the inward length of the billet that drying of the moist refractory lining, is most difficult because the material rammed around the billet is protected against evaporation of the new material's water content, by the surrounding furnace construction forming the opening for passage of the billet or hearth electrode.

BRIEF DESCRIPTION OF THE DRAWINGS

Examples of the present invention are illustrated by the accompanying drawings in which.

DETAILED DESCRIPTION OF THE INVENTION

Figure 1:
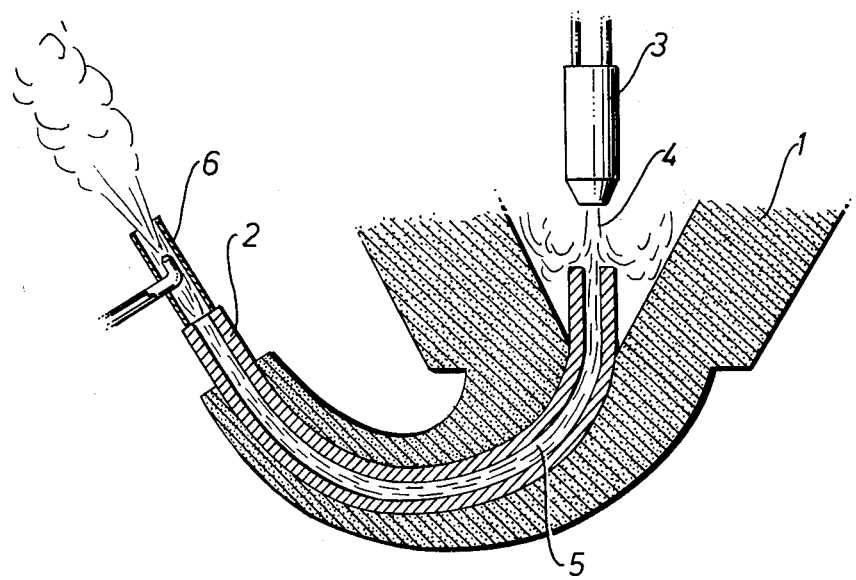
FIG. 1 is a vertical cross section schematically showing the principles of the present invention when in operation.

Having reference to the above drawings, and referring first to FIG. 1, the moist lining composition 1, such as magnesite compound, is shown as it appears when rammed around the billet 2, the composition 1 being shown as being substantially completely dried by the use of a gas burner 3 producing a flame 4 of high thermal energy at the inner end of the billet 2 which, in accordance with the present invention, is provided with the hole 5, a steam or air-actuated ejector 6 being connected to the outside end of the billet 2 to draw the hot products of combustion of the flame 4, throughout the length of the billet 2. The hole 5 is formed in accordance with normal casting techniques, the billet 2 being a steel casting.

Figure 2:
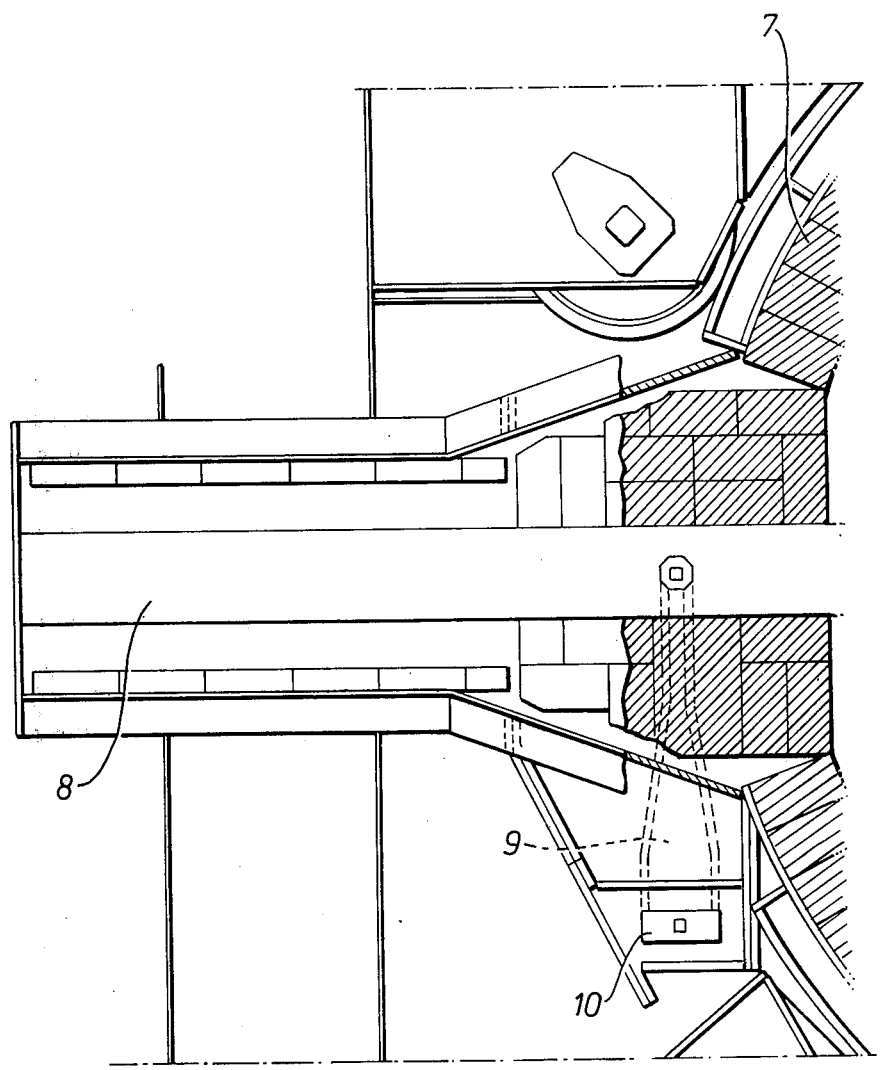
FIG. 2 is a horizontal cross section through the furnace vessel of a typical direct current arc furnace, showing the curved type of hearth electrode in a case where its inner end contacts the melt normally present in the furnace's run-out chute leading to its upwardly inclined pouring spout, the pouring spout being shown free from cross section and looking downwardly.

FIG. 2 shows the melt run-out chute of a furnace construction 7, the chute leading to the upwardly inclined pouring spout 8 of the furnace, through which a finished heat of steel in the furnace is poured by normal tilting action of the furnace, with the chute provided with a curved hearth connection 9 of which only the inner end is shown in solid lines, this inner end pointing upwardly into the passage of the chute. This billet gradually diverges outwardly in the interest of heat conduction to the necessary water-cooling arrangement (not shown) used to prevent that portion of the billet from melting, recognizing that when in operation the inner end portion will become liquid and merge with the melt in the furnace. It is this outer end to which the electrical connection 10 for the direct current power line, is provided.

Figure 3:
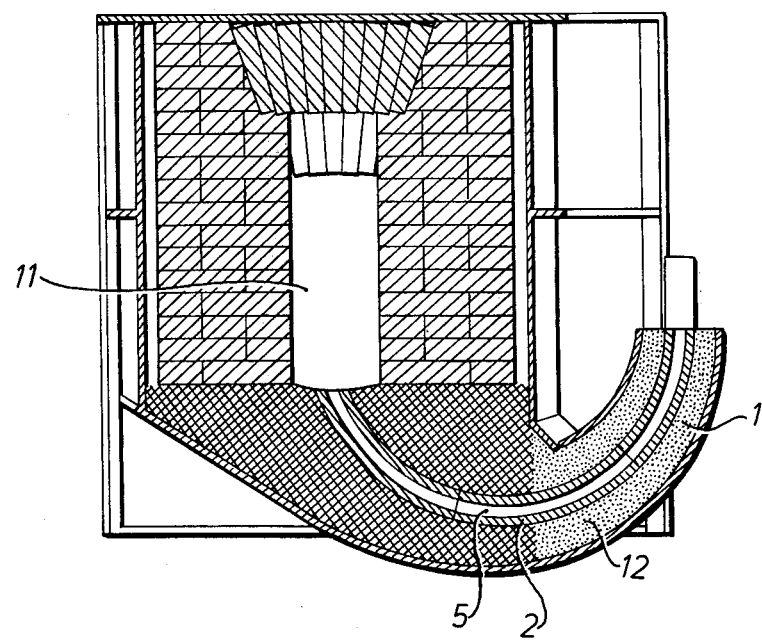
FIG. 3 is a cross section taken through FIG. 2 in a vertical plane cutting the hearth connection.

In the vertical cross section shown by FIG. 3 the billet is shown with its hole 5 and its lower end exposed to the bottom of the chute, here indicated at 11, and into which a part of the melt in the furnace flows when the furnace is in operation.

In this FIG. 3 the portion indicated by oppositely pitched cross-hatching lines indicates the portion that is more easily dried and which can be dried with a fair degree of rapidity by the prior art practice of heating the inner end of the billet or connection in the case of the prior art solid construction of this part. The portion shown at 12 represents the area of the newly rammed moist lining that is the more difficult to dry by the prior art technique. Reference to FIG. 1 shows how with the hot gases flowing through the billet even the portion 12 of the rammed moist refractory, can be effectively dried in a relatively short time.

It is to be understood that in the case of a new furnace its lining is layed up from previously dried refractory materials, and, if necessary, the lining can be heated without difficulty. In the case of the hearth electrode, either for a new furnace construction or as a replacement for a used furnace construction, the initially moist refractory material which must be rammed around the billet, the ramming material having its surface necessarily closed off from the ambient atmosphere, presents a difficult drying problem, which is, however, solved by the present invention.

After drying, the billet hole remains, but when the melt tries to flow through the hole, the melt solidifies as it approaches the cooled outer portion of the billet. After that, the billet operates as would an initially solid billet.

What is claimed is:

1. A method for drying a new hearth electrode installation of a DC electric arc furnace, the new installation comprising a metal billet extending through a wall portion of the furnace, the billet having an inside end which will be contacted by a melt in the furnace during operation of the furnace, and an outside end for an electrical connection, and at least slightly moist refractory surrounding the billet; said method comprising forming a hole lengthwise through the billet and passing hot gas through the hole to heat the billet until said refractory is substantially dried.

2. The method of claim 1 in which the hot gas is formed by gas burned at the inside end of the billet and suction is applied at the billet's outside end to suck the gas through the billet's hole.

* * * * *